(No Model.)
W. H. LE SUER & F. R. BASSETT.
CLOSURE FOR CHURNS.
No. 400,093. Patented Mar. 26, 1889.
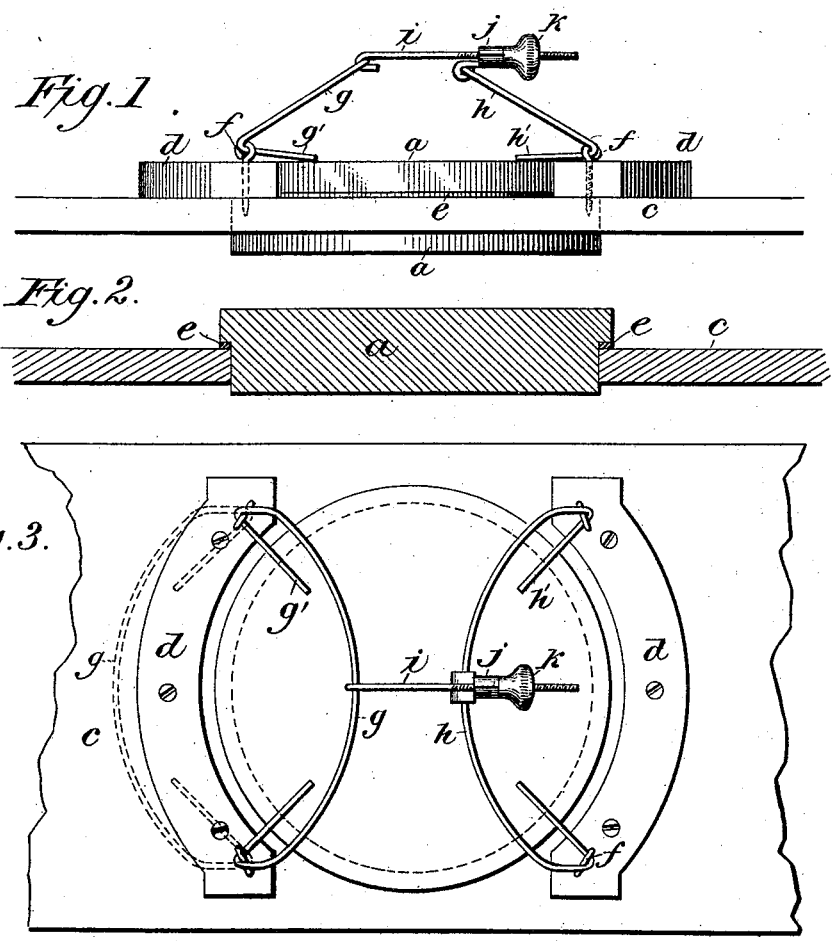
Witnesses:
Frank Beard
J. H. Gilmor
Inventors.
William H. LeSuer
Fred R. Bassett

UNITED STATES PATENT OFFICE.

WILLIAM H. LE SUER AND FRED R. BASSETT, OF ABERDEEN, DAKOTA TERRITORY.

CLOSURE FOR CHURNS.

SPECIFICATION forming part of Letters Patent No. 400,093, dated March 26, 1889.

Application filed July 27, 1888. Serial No. 281,253. (No model.)

*To all whom it may concern:*

Be it known that we, WILLIAM H. LE SUER and FRED R. BASSETT, citizens of the United States, residing at Aberdeen, in the county of Brown and Territory of Dakota, have invented a new and useful Closure for Churns, of which the following is a specification.

Our invention relates to improvements in churn-closures in which bended spring-wires operate in conjunction with a bolt and nut; and the object of our improvements is to provide a secure fastening for the cover of churns. We attain this object by the mechanism illustrated in the accompanying drawings, in which—

Figure 1 is an elevated section of the entire machine; Fig. 2, a detail top view of the entire machine; Fig. 3, a section edge view of the churn top and cover as it appears after the removal of the fastenings.

Similar letters refer to similar parts throughout the several views.

The table $c$, Fig. 2, and the plates $d\ d$, secured by screws to the table, constitute the frame-work of the machine. In the loops $f\ f$ turn the bails $g\ h$, which are connected by the bolt $i$, secured by the sliding loop J and adjusted by the nut $k$. Figs. 1 and 3 represent the cover of the churn resting on the top $c$, between which lies a circular rubber, $e\ e$. The bails have ends $g'\ h'$ projecting through the loops and resting upon the cover $a$ to hold it in place, and at their central portions they are connected by the bolt $i$, the slide J, and nut $k$. The bolt $i$ has a hook at one end engaging with the bail $g$, and is screw-threaded at the other end. The slide J fits loosely over the threaded end of the bolt $i$ and has a loop engaging the bail $h$. The nut $k$ is interiorly threaded to fit the thread on the bolt $i$, and by screwing the nut upon the bolt the central portions of the bails are drawn together, their ends are pressed upon the cover, and the cover is held in place.

What we claim as our invention, and desire to secure by Letters Patent, is—

1. The combination, with the bails $g\ h$, journaled on the loops $f$ on the churn-head and having the ends $g'\ h'$ extending through the loops $f$ and resting on the churn-cover, of a means for drawing the central portions of the bails together, whereby the bail ends are pressed upon the cover and the cover is held in place.

2. The combination, with the bails $g\ h$, journaled in the loops $f$ on the churn-head and having the ends $g'\ h'$ extending through the loops $f$ and resting on the churn-cover, of the threaded bolt $i$, having the hook engaging the bail $g$, the slide J, having the loop engaging the bail $h$, and the threaded nut $k$, as and for the purpose stated.

WILLIAM H. LE SUER.
FRED R. BASSETT.

Witnesses:
FRANK BEARD,
C. G. BURNETT.